United States Patent [19]

Norrgran

[11] Patent Number: 4,541,993

[45] Date of Patent: Sep. 17, 1985

[54] PROCESS FOR THE SULFATIZATION OF NON-FERROUS METAL SULFIDES

[75] Inventor: Daniel A. Norrgran, Tucson, Ariz.

[73] Assignee: Atlantic Richfield Company, Los Angeles, Calif.

[21] Appl. No.: 553,635

[22] Filed: Nov. 21, 1983

Related U.S. Application Data

[63] Continuation of Ser. No. 365,152, Apr. 5, 1982.

[51] Int. Cl.$^4$ .................... C01G 53/10; C01G 51/10; C01G 3/10; C01G 9/06
[52] U.S. Cl. .................................. 423/27; 423/45; 423/106; 423/109; 423/146; 423/150; 75/72; 75/82; 75/87; 75/101 R; 75/115
[58] Field of Search .................... 75/1 R, 101 R, 115, 75/72, 87, 82; 423/41, 45, 98, 106, 128, 146, 166, 27, 106, 109, 150

[56] References Cited

U.S. PATENT DOCUMENTS

| | | | |
|---|---|---|---|
| 1,289,072 | 12/1918 | Annable | 423/146 |
| 2,187,750 | 1/1940 | Marvin | 423/87 |
| 4,110,106 | 8/1978 | Frankiewicz | 423/146 |

*Primary Examiner*—John Doll
*Assistant Examiner*—Robert L. Stoll
*Attorney, Agent, or Firm*—F. Lindsey Scott

[57] ABSTRACT

In the extraction of certain non-ferrous metals from their sulfide ores by a process where these sulfides are converted to water soluble sulfates by roasting, alkali metal carbonate or bicarbonate, especially sodium carbonate, is added to the roaster feed to promote the sulfatization reaction. Ores containing copper, nickel, cobalt or zinc sulfides are concentrated by froth flotation, the concentrate mixed with carbonate or bicarbonate and roasted. The roasted product is mixed with water to separate these metals as soluble sulfates from iron compounds and other solid residue. The sulfate solution is filtered from the solids and the non ferrous metals recovered by precipitation or electrolysis.

7 Claims, 3 Drawing Figures

PROCESS FOR THE SULFATIZATION OF NON-FERROUS METAL SULFIDES

This application is a continuation of application Ser. No. 365,152, filed Apr. 5, 1982.

FIELD OF THE INVENTION

This invention is concerned with the extraction of certain non-ferrous metals from their ores and more particularly with a process for the sulfatization of such metal values from their sulfide ores.

BACKGROUND OF THE INVENTION

Metals are commonly extracted from their ores by processes in which the minerals are concentrated and the concentrate roasted to convert complex or otherwise difficult-to-extract metal compounds into compounds which can more easily be separated for recovery of the metal content.

In one such process, applicable to sulfide minerals, sulfides are converted by roasting into water soluble sulfates which may readily be recovered by leaching with water.

It is generally agreed that the mechanism involved in converting sulfides to sulfates proceeds via an oxide as follows:

$$MS + 3/2\, O_2 \rightarrow MO + SO_2 \tag{1}$$

$$SO_2 + \tfrac{1}{2} O_2 \rightarrow SO_3 \tag{2}$$

$$MO + SO_3 \rightarrow MSO_4 \tag{3}$$

wherein M represents metal. (See Palperi, M. and Aaltonen, O., Sulfatizing Roasting and Leaching of Cobalt Ores at Outokumpu Oy, Journal of Metals, February 1971, pp. 34–38.)

For the sulfatization process to be economical, sufficiently high percentages of the metals must be converted under reasonable operating conditions to easily extractable water soluble sulfates while other, undesired materials remain insoluble. In particular, it is important that the iron content of the ore remains insoluble so that it can easily be disposed of as a solid by-product, rather than being leached as a water soluble product which would require subsequent, difficult separation and disposal steps.

Some of the desired non-ferrous metals in sulfide ores can be difficult to recover as water soluble sulfates in the sulfatization process. Nickel in particular is difficult to sulfatize efficiently. Attempts to sulfatize nickel sulfides were unsuccessful until Thornhill, in U.S. Pat. Nos. 2,813,015 and 2,813,016, showed that the addition of sodium sulfate to the roaster feed promoted the sulfatization of nickel sulfide. The sodium sulfate is used to control particle size in a fluidized bed and is said to render unstable the nickel ferrites in pyrrhotite according to the following equation:

$$NiFe_2O_4 + Na_2SO_4 \rightarrow Na_2Fe_2O_4 + NiSO_4 \tag{4}$$

These patents also describe sodium sulfate taking part in reactions providing sodium pyrosulfate, a strong sulfating agent, and sulfur trioxide for sulfatization of the metal oxide:

$$Na_2SO_4 + SO_3 \rightarrow Na_2S_2O_7 \tag{5}$$

$$NiO + SO_3 \rightarrow NiSO_4 \tag{6}$$

Thus, these patents demonstrate the addition of a sulfate material as a requirement to enhance the sulfatization of nickel. While the use of sodium sulfate in the roast does provide significant improvement in the amount of metal extracted as water soluble sulfate, the percentage of such metal extracted from the raw material needs to be increased for improved process economics. Unfortunately, the addition of sodium sulfate to the roaster increases the sulfur content of the roast and contributes to the generation of sulfur dioxide and sulfur trioxide gases during the roasting procedure. This is undesirable because these gases are subject to pollution control regulations so that increasing their quantity in the off gases increases the cost of pollution control and thereby also increases the cost of the extraction process.

Attempts have been made to decrease the amount of toxic sulfur gases liberated in the sulfatization process. In U.S. Pat. No. 3,791,812, copper, nickel, cobalt and manganese are extracted as water soluble salts from sulfide ores by roasting the ore in the presence of sodium chloride. The use of sodium sulfate is avoided and the amount of sulfur dioxide in the off gases is reduced by conducting the roasting in at least two stages and using sulfur dioxide liberated in the first stage as a sulfatizing agent in a subsequent stage. Unfortunately, iron as well as the non-ferrous metals is extracted as a water soluble salt, necessitating the expense of further separation steps to remove the iron.

Other alkali metal salts besides sodium sulfate and chloride have been used in the extraction of non ferrous metals from their ores. U.S. Pat. No. 2,775,517 discloses a process for separating nickel from low sulfur content iron oxide ores. The ore is roasted with alkali, such as sodium hydroxide, carbonate or bicarbonate and the roasted product leached with water to extract chromium and aluminum. The nickel remains in a water insoluble state and is subsequently removed by treatment in an autoclave with ferric or ferrous chloride or sulfate. This process is not a sulfatization process because the raw material is not a sulfide ore. The process suffers from the disadvantages that the nickel is not converted into a readily-leachable, water soluble salt and that an autoclave is required, thereby increasing plant and operating costs and processing complexity.

There is, therefore, a need for a process for extracting non-ferrous metals from sulfide ores by sulfatization of such metals into readily leachable salts which extracts high percentages of the metals in the ore in an economical and environmentally acceptable process.

SUMMARY OF THE INVENTION

We have now found that these objectives may be achieved by including alkali metal carbonate or bicarbonate in the sulfatizing roast. It is quite unexpected that the addition of carbonate should have this effect since Thornhill's hypothesis, mentioned above, clearly requires the addition of sulfate material. Moreover, we have surprisingly found that the addition of carbonate material in this invention still forms water soluble sulfates in the sulfatization process rather than soluble carbonate products. Utilization of a carbonate or bicarbonate additive, instead of a sulfate, eliminates the addition of further sulfur to the roast and improves the sulfatization process and in doing so uses more of the natural sulfur in the sulfides in the ore and produces less sulfur-containing off gases. In addition, the additives in this invention are less expensive. Sodium carbonate, for example, is less expensive on a bulk scale than sodium sulfate.

According to the invention there is provided a process for the sulfatization of non-ferrous metal sulfide which comprises roasting sulfide mineral containing said metal sulfide in the presence of alkali metal carbonate or bicarbonate and converting at least a portion of said metal sulfide into water soluble non-ferrous metal sulfate.

In one embodiment of the invention, the sulfatization process is used in a process for the extraction of non-ferrous metal from sulfide mineral containing non-ferrous metal sulfide. The extraction process comprises roasting the mineral in the presence of alkali metal carbonate or bicarbonate and converting at least a portion of the non-ferrous metal sulfide into water soluble, non-ferrous metal sulfate. The roasted product containing the soluble sulfate is washed with water to leach out the soluble metal sulfate from the solid materials and the non-ferrous metal content of the sulfate solution is recovered.

The process of the invention is particularly applicable to the sulfatization of at least one of cobalt, copper, nickel and zinc.

In the process of the invention, a sulfide ore, such as a low grade copper-nickel-cobalt ore, is milled to reduce the particle size of the ore and then, preferably, concentrated such as by flotation. Alkali metal carbonate or bicarbonate is mixed with dried concentrate or ore and the mixture is fed to a furnace for roasting. Typical roasting conditions are a temperature of from about 400° to 650° C., generally including a period at about 550° C. to 630° C., and a time of from 2 to 6 hours. The roasted material is allowed to cool and the soluble sulfates leached into solution by washing the roasted product with water. The sulfate solution is separated from insoluble residues by filtration and the metal values recovered by conventional means such as solvent extraction and electrowinning.

DETAILED DESCRIPTION OF THE PREFERRED EMBODIMENTS

Figure 1:
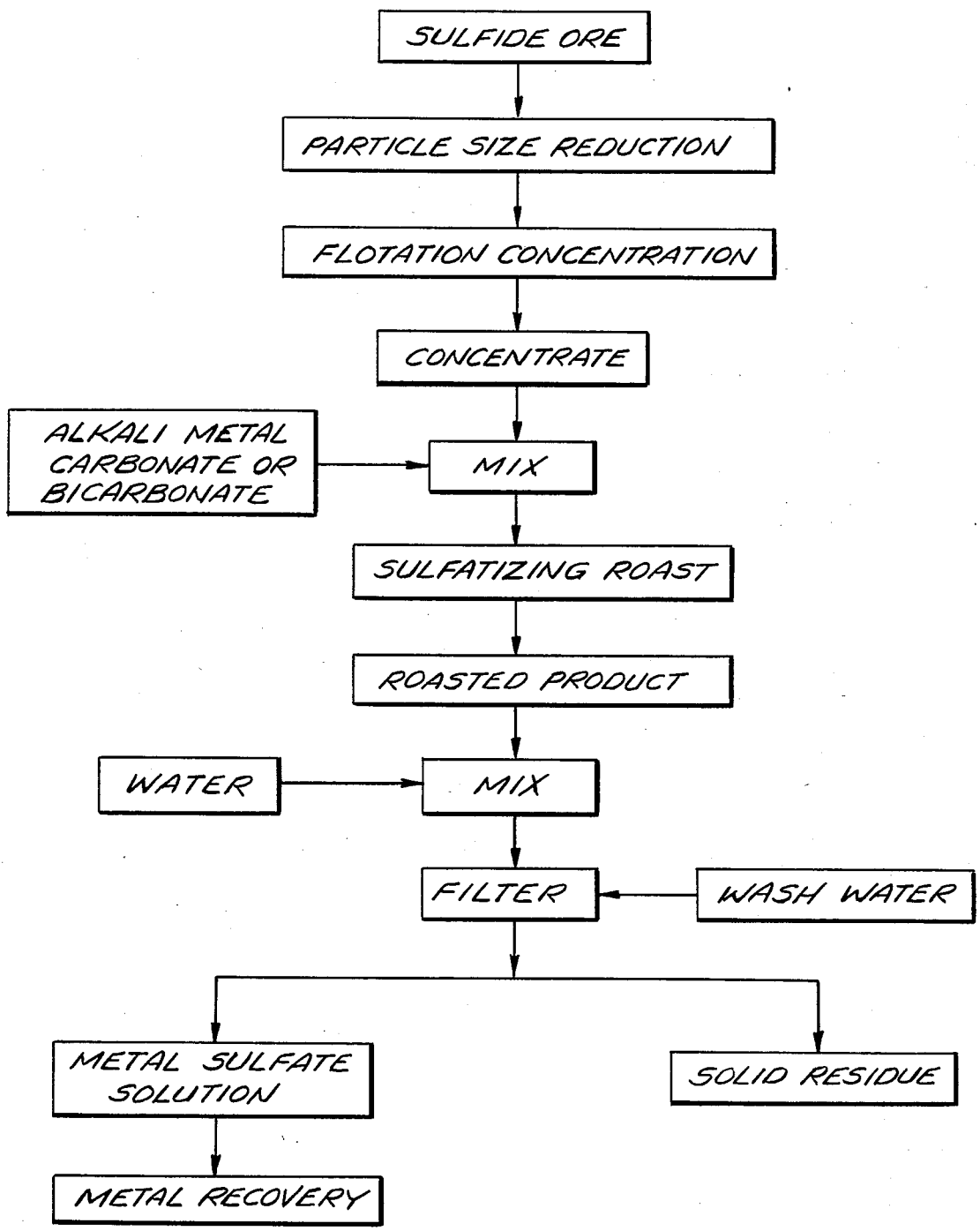
FIG. 1 is a flowsheet illustrating the steps in the process of the invention.
Figure 2:
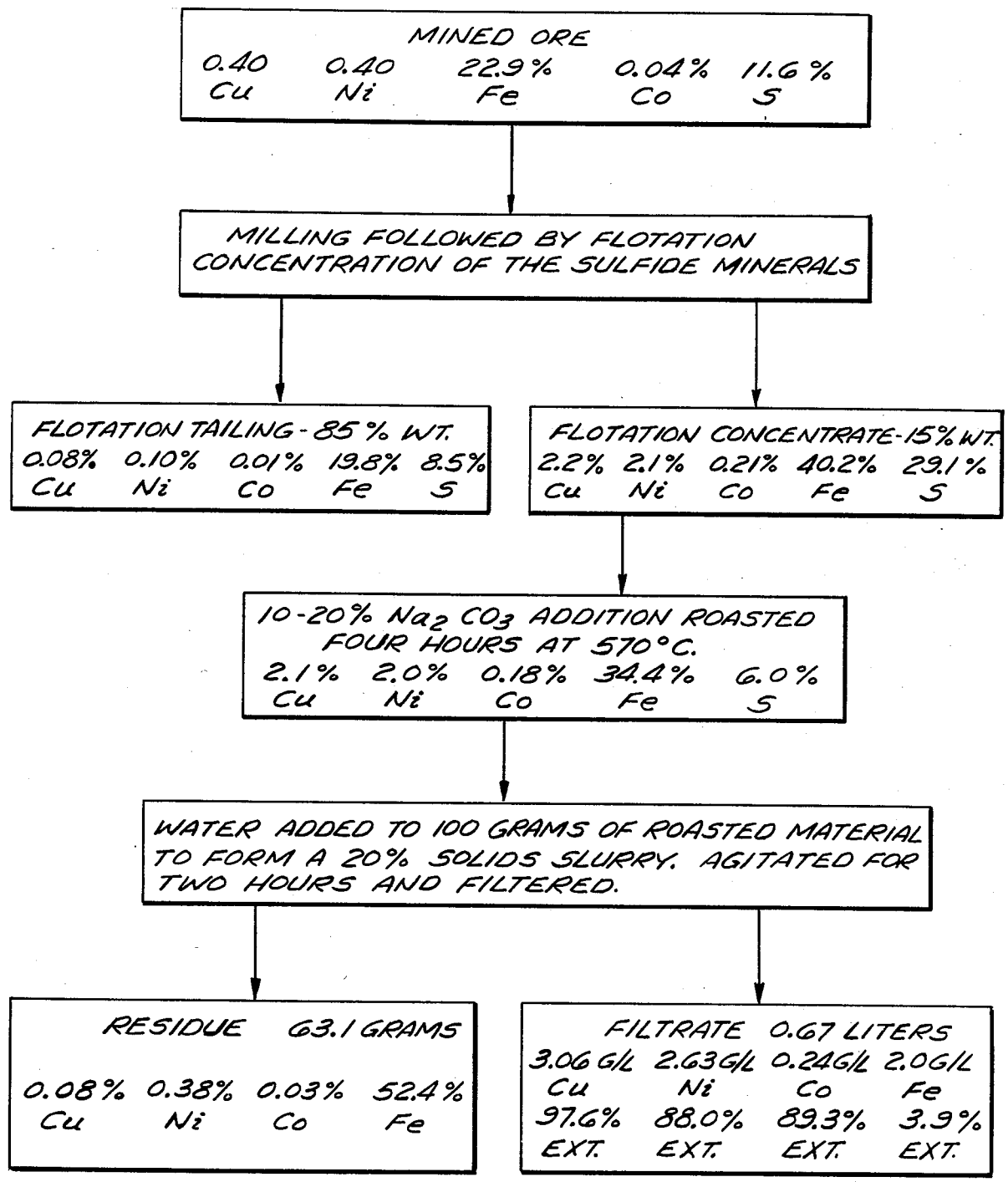
FIG. 2 is a flowsheet illustrating representative changes in chemical composition of the products through the steps of the process of the invention.

Referring to FIG. 1, the process of the invention uses sulfide ore as the raw material. The ore contains one or more of the metals copper, cobalt, nickel and zinc and may be a high or low grade ore. The process is economically attractive for use on low grade ores and for this reason such ores are the preferred starting material. Preferred ores include copper-nickel-cobalt and copper-lead-zinc sulfide ores. A typical low grade copper-nickel-cobalt ore is illustrated as the starting material in FIG. 2 and contains approximately 0.4% copper, 0.4% nickel, 0.04% cobalt, 23% iron and 12% sulfur. All percentages herein are by weight unless otherwise specified.

The ore is milled by conventional methods to a suitable particle size and then concentrated with respect to sulfide minerals. The concentration step is not necessary in order to achieve optimum response with the roasting process of the invention. While unconcentrated ores may be used in the process of this invention it is preferred that the ore be concentrated as shown in FIG. 1. The concentration process is simply a case of processing economics. Ideally, through the concentration process, a considerable amount of ore weight will be rejected with only a minor loss in metal values. In the process depicted in FIG. 2, flotation concentration recovers 83% of the copper, 79% of the nickel and 79% of the cobalt in 15% of the original ore weight. With the concentrate representing only 15% of the weight of the original feed ore, a considerable reduction in capital and operating costs in the subsequent treatment stages is realized. In the ore exemplified in FIG. 2, it can be seen that the concentration process substantially increases the percentage content of non-ferrous metals and therefore provides a material for subsequent processing from which it is easier to extract the desired metals. Of the various concentration techniques available, froth flotation has been found to yield the best metallurgical results with this particular ore.

The concentrate may then be ground to further reduce the particle size and is dried, for example at about 120° C. Alkali metal carbonate or bicarbonate is mixed with the dried concentrate, preferably in an amount of from 5% to 50%, more preferably from about 10 to 20%, based on the weight of dry concentrate, or ore if the concentration step is omitted.

Sodium or potassium carbonates or bicarbonates may be used as the alkali metal additive. The sodium compounds are preferred, particularly sodium carbonate which has been found to provide optimum results while being relatively inexpensive and readily obtainable.

The carbonate-concentrate mixture is fed to a furnace for roasting to convert the metal sulfides to sulfates. During roasting the roast may be rabbled periodically to maximize reaction.

Reactions for some typical sulfide minerals ores are shown below:

$$2\,CuFeS_2 + 6\tfrac{1}{2}O_2 \rightarrow 2CuO + Fe_2O_3 + 4SO_2 \tag{7}$$

$$CuO + SO_3 \rightarrow CuSO_4 \tag{8}$$

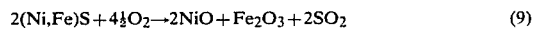

$$2(Ni,Fe)S + 4\tfrac{1}{2}O_2 \rightarrow 2NiO + Fe_2O_3 + 2SO_2 \tag{9}$$

(assuming equivalent quantities of Ni and Fe)

$$NiO + SO_3 \rightarrow NiSO_4 \tag{10}$$

$$2FeS + 3\tfrac{1}{2}O_2 \rightarrow Fe_2O_3 + 2SO_2 \tag{11}$$

$$Fe_2O_3 + 3SO_3 \rightarrow Fe_2(SO_4)_3 \tag{12}$$

Roasting temperature is dictated by the decomposition temperatures of the sulfates of the metals to be extracted. Optimum temperatures for the conversion of the mineral sulfides to the sulfate state (for a given roasting time and atmospheric condition) exist when the decomposition temperatures are approached. By maintaining the reaction temperature either below or above the decomposition temperature, more or less of the particular sulfate can be obtained. This characteristic provides the means for setting conditions that theoretically will selectively sulfatize the non-ferrous metal values, such as Cu, Co, Ni and Zn, while the iron sulfates are decomposed. However, when a sulfatizing roast is conducted on several different sulfide minerals, even under optimum roasting conditions, only a partial sulfatization is effected and the metallurgical response of the copper and cobalt sulfides is much more favorable than the response of the nickel sulfides. Similarly, in practice, decomposition of the iron sulfates is not ideal since decomposition is usually incomplete and therefore it is important that the leaching step extracts the maximum amount of non-ferrous water soluble sulfates but the minimum amount of iron sulfates.

Accordingly, the temperatures used in the process of this invention depend on the metal or metals to be extracted. Where an individual metal is to be extracted, the temperature will approach the decomposition temperature of the sulfate of that metal. Where a number of metals are to be extracted, as is usually the case, the temperature will approach the lowest decomposition temperature of the metal sulfates in question. The energetic decomposition temperatures of $FeSO_4$, $ZnSO_4$, $CuSO_4$, $CoSO_4$ and $NiSO_4$ are 480°, 600°, 670°, 735° and 764° C., respectively (Hodgman, C. D. ed. Handbook of Chemistry and Physics, 37th edition, 1955, p. 1812 and 48th edition, 1967 pp. B-172, -241). Preferred roasting temperatures in the process of the invention range from about 400° to 650° C. Temperatures from about 400° to 500° C. may be used for a proportion of the roasting period but a temperature greater than the decomposition temperature of iron sulfate, about 500° C., is required for a significant proportion of that period so as to promote conversion of the iron sulfate to insoluble iron oxide. More preferred roasting temperatures are from about 550° C. to 650° C., conveniently about 550° to 600° C., such as about 570° C. As can be seen from FIG. 3, high percentages of copper and nickel and low percentages of iron are extracted over a wide range of temperature.

Roasting time has a significant effect on the efficiency of the process of the invention. Generally longer roasting times convert more sulfide mineral to sulfate but long roasting times decrease the economy of the process. A preferred time is from two to six hours, for example about four hours.

The roasted product is allowed to cool and is then leached with water, conveniently with sufficient water to provide a 15 to 20% solids slurry. The slurry is then agitated, for example for about two hours, to maximize extraction of the water soluble sulfates. The slurry is filtered and optionally washed with more water to ensure that any residual water soluble sulfates are carried into the product solution. The liquid or filtrate portion contains the water soluble sulfates of nickel, cobalt, copper or zinc. As can be seen from FIG. 2, on a laboratory scale high percentages of copper, nickel and cobalt are extracted into the filtrate with very little iron. The non-ferrous metals may be recovered from the solution by conventional means. For example, the sulfates may be recovered by precipitation or by solvent extraction and electrolysis.

Various parameters of the process of the invention were investigated in the laboratory to determine their effect on the efficiency of the process. In the tests which follow it is shown that the process of the invention enhances the extraction of nickel, cobalt, copper and zinc as water soluble sulfates in the sulfatization of their sulfide ores while minimizing the extraction of iron as water soluble sulfate.

TEST SERIES 1

In a first series of tests, numbers 1 to 4, a copper-nickel-cobalt sulfide concentrate was composited from products of various froth flotation tests. The composite assayed the following percentages: 0.69 Cu, 1.23 Ni, 53.0 Fe, and 30.4 S. The composite was wet ground to 200 mesh in a laboratory ball mill, dried at 120° C., and split into 200 gram batches for comparison roasting tests. The specified amount of additive was blended into the sample with a mortar and pestle just prior to roasting. The sample was then placed in a refractory boat. The material in the boat had an approximate depth of 1 cm. The boat was then placed in an unvented muffle furnace, which was at room temperature, and the temperature controller was then set to 420° C. The heating period to 420° C. was fairly linear and took approximately 40 minutes. The temperature was then held at 420° for 140 minutes. Upon completion of this initial roasting period, the temperature controller was set to 610° C. It took approximately 30 minutes to reach 610° C. and was then held at this temperature for 210 minutes. Upon reaching 610° C., the ore was rabbled every 30 minutes for the duration of the roast. After the ore was subjected to this second stage roast, the furnace was turned off and allowed to cool before the boat was removed.

After completing the roasting procedure, the roasted material was removed from the refractory boat and 130 grams were split out for leaching. The remainder of the material was submitted for chemical analysis. The leach sample was then placed in a 1 liter beaker containing 600 grams of distilled water. This slurry was then agitated for 2 hours. Leach tests were conducted in an open vessel beaker at room temperature. After 2 hours of agitation, the slurry was filtered and washed with 300 grams of distilled water. The filtrate and wash solution was collected and its volume was measured. The filtered leach residue was dried and weighed. Both the filtrate solution and leach residue were submitted for chemical analysis in order to evaluate the metal extractions.

Presented in Table 1 is a descriptive tabulation of the roasting tests performed. The four roasting tests were conducted in the exact same manner with the exception of types and amounts of additive.

Presented in Table 2 is a partial chemical analysis of the leaching products and the metal extractions. The extractions represent the amount of metal (Cu, Ni, Fe, Co) that was leached from the roasted material which reports to the leach filtrate. The calculated head for each test represents an analysis of the roasted products calculated from the analyses of residue and filtrate material. The addition of sodium carbonate greatly increased the copper, nickel, and cobalt extractions over the test that was void of an additive and significantly increased the extractions, especially that of nickel, over those tests containing the sodium sulfate additive. For example, an extraction of 94.8 percent nickel was experienced when the ore was roasted with sodium carbonate. When the ore was roasted without an additive, a nickel extraction of 20.6 percent was experienced. The two tests that contained sodium sulfate average an 84.5 percent nickel extraction.

TABLE 1

DESCRIPTIVE TABULATION OF THE ROASTING TESTS

| | | ROASTING* | | | |
|---|---|---|---|---|---|
| | | First Stage | | Second Stage | |
| Test | Additive | Time (Min) | Temp (°C.) | Time (Min) | Temp (°C.) |
| 1 | None | 140 | 420 | 210 | 610 |
| 2 | 8% Na2SO4 | 140 | 420 | 210 | 610 |
| 3 | 10% Na2CO3 | 140 | 420 | 210 | 610 |
| 4 | 12% Na2SO4 | 140 | 420 | 210 | 610 |

*Roasting samples experienced heating and cooling of the furnace prior to and after the duration of the roast.

TABLE 2

ANALYSIS AND EXTRACTION OF ROAST-LEACH PRODUCTS

| Test | Product | Weight or Volume | Analysis* | | | | Extraction Percent | | | |
|---|---|---|---|---|---|---|---|---|---|---|
| | | | Cu | Ni | Fe | Co | Cu | Ni | Fe | Co |
| 1 | Residue | 125.6 g | 0.35 | 1.03 | 65.6 | 0.070 | | | | |
| | Filtrate | 960 ml | 0.43 | 0.35 | 0.10 | 0.078 | 48.4 | 20.6 | 0.1 | 59.8 |
| | Calc Head | 130.0 g | 0.66 | 1.25 | 63.5 | 0.125 | | | | |
| 2 | Residue | 105.4 g | 0.04 | 0.28 | 66.0 | | | | | |
| | Filtrate | 975 ml | 0.80 | 1.34 | 0.85 | nm** | 94.9 | 81.6 | 1.2 | nm** |
| | Calc Head | 130.0 g | 0.63 | 1.23 | 54.1 | nm** | | | | |
| 3 | Residue | 93.2 g | 0.03 | 0.10 | 56.5 | 0.009 | | | | |
| | Filtrate | 920 ml | 0.81 | 1.86 | 3.10 | 0.120 | 96.4 | 94.8 | 5.1 | 92.9 |
| | Calc Head | 130.0 g | 0.60 | 1.39 | 42.7 | 0.091 | | | | |
| 4 | Residue | 101.8 g | 0.04 | 0.22 | 59.0 | 0.080 | | | | |
| | Filtrate | 870 ml | 0.73 | 1.78 | 1.28 | 0.120 | 94.0 | 87.4 | 1.8 | 88.9 |
| | Calc Head | 130.0 g | 0.52 | 1.36 | 47.1 | 0.140 | | | | |

*Analysis of Residue and Calculated Head as percent by weight. Analysis of Filtrate given as grams per liter.
**nm = not measured

TEST SERIES 2

In a second series of tests, numbers 5 to 7, a copper-nickel-cobalt sulfide concentrate was again composited from products of various froth flotation tests. This composite assayed the following percentages: 1.80 Cu, 1.19 Ni, 51.2 Fe, 30.5 S, and 0.11 Co. The second test series of roasting tests were conducted in a similar manner as was the first series of roasting tests. The composite was wet ground to 200 mesh in a laboratory ball mill, dried at 120° C., and split into 150 gram batches for comparison roasting tests. Again the specified amount of additive was blended into the sample with a mortar and pestle just prior to roasting. The sample was then placed in a refractory boat. In this test series, the ore was subjected a less severe, single stage roast. After the refractory boat was placed in an unvented muffle furnace, which was at room temperature, the temperature controller was set to 610° C. The heating period was fairly linear and took approximately 70 minutes. The temperature was then held at 610° C. for 150 minutes with the ore being rabbled every 30 minutes for the duration of the roast. After 150 minutes at 610° C., the furnace was turned off and allowed to cool before the boat was removed.

The leaching procedure in test series 2 was conducted in the exact manner as was the leaching procedure in test series 1 with the exception of a reduction in both the amount of roasted material and water used in the leaching process. The leach process consisted of 100 grams of roasted material combined and agitated with 500 grams of water.

Presented in Table 3 is a descriptive tabulation of the roasting tests performed and a partial chemical analysis of the roasted products. The three roasting tests were conducted in the exact same manner with the exception of types and amounts of additives.

Presented in Table 4 is a partial chemical analysis of the leaching products and the metal extractions. The extractions represent the amount of metal (Cu, Ni, Fe) that was leached from the roasted material which reports to the leach filtrate. Although cobalt extractions were successful in both the sodium carbonate and sodium sulfate roast-leach, they were not accounted for because of the minor amount of cobalt present in the composite. Again the addition of sodium carbonate greatly increased the copper, nickel, and cobalt extractions over the test that was void of an additive and increased the extractions over that test conducted with an equal amount of sodium sulfate.

TABLE 3

DESCRIPTIVE TABULATION OF THE ROASTING TESTS

| | | ROASTING* | |
|---|---|---|---|
| Test | Additive | Time (Min) | Temp (°C.) |
| 5 | None | 150 | 610 |
| 6 | 10% Na2CO3 | 150 | 610 |
| 7 | 10% Na2SO4 | 150 | 610 |

*Roasting samples experienced heating and cooling of the furnace prior to and after the duration of the roast.

TABLE 4

ANALYSIS AND EXTRACTION OF ROAST-LEACH PRODUCTS

| Test | Product | Weight or Volume | Analysis* | | | Extraction Percent | | |
|---|---|---|---|---|---|---|---|---|
| | | | Cu | Ni | Fe | Cu | Ni | Fe |
| 5 | Residue | 94.8 g | 1.00 | 1.30 | 65.0 | | | |
| | Filtrate | 730 ml | 1.62 | 0.30 | 0.04 | 55.5 | 15.1 | 0.1 |
| | Calc Head | 100.0 g | 2.13 | 1.45 | 61.6 | | | |
| 6 | Residue | 76.1 g | 0.12 | 0.43 | 61.4 | | | |
| | Filtrate | 735 ml | 2.50 | 1.06 | 0.58 | 95.3 | 70.4 | 0.9 |
| | Calc Head | 100.0 g | 1.93 | 1.11 | 47.2 | | | |
| 7 | Residue | 78.4 g | 0.14 | 0.49 | 63.4 | | | |
| | Filtrate | 745 ml | 2.40 | 1.09 | 0.73 | 94.4 | 67.9 | 1.1 |
| | Calc Head | 100.0 g | 1.90 | 1.20 | 50.2 | | | |

*Analysis of Residue and Calculated Head as percent by weight. Analysis of Filtrate given as grams per liter.

TEST SERIES 3

In a third series of tests, numbers 8 to 20, various ores and concentrates were tested. One 150 gram batch was roasted per test. The specified amount of additive was blended into the sample with a mortar and pestal just prior to roasting. An unvented muffle furnace was heated to 570° C. and each sample, uniformly spread in a refractory boat, was placed in the furnace for four hours. The samples were rabbled every 30 minutes during the roast. The refractory boat was removed from the furnace immediately upon completeion of the roast and allowed to cool. One hundred grams was split from the roasted sample, placed in a beaker and distilled water was added to produce a 15 percent solids solution. The slurry was agitated for two hours at room temperature and then filtered and washed. A chemical analysis of the residue and filtrate was performed to determine the recovery of the metals in soluble form.

The various ores and concentrates are listed in Table 5. Core samples were used as mineral sources for Tests 8 to 17. Since core samples are not homogeneous, samples for individual tests which are taken from different portions of a core sample will have slightly different assays.

Tests 8 to 17 were conducted on copper-nickel-cobalt concentrates and ores. Tests 8, 9 and 10 used concentrate from a core sample (A) which was taken from the same area as the samples used to prepare the concentrates in Test Series 1 and 2. Tests 11 to 15 were conducted on concentrate from a different core sample (B) but which had a mineralogy very similar to (A) and was taken from the same area as sample (A). Tests 16 and 17 were conducted on ore and concentrate respectively of a core sample (C) of a massive sulfide ore containing quantities of copper, nickel and cobalt taken from a different area than samples (A) and (B).

Tests 18, 19 and 20 were conducted on ore (D) which was a copper, lead and zinc bearing ore.

Presented in Table 6 are the metallurgical results of Tests 8 to 17. The results demonstrate the excellent extraction efficiencies achieved by the process of the invention and show that potassium carbonate as well as sodium carbonate gives good results. Test 16 shows that the process of the invention is applicable to ores as well as concentrates. Although extractions from the concentrate, in Test 17, were better than from the ore, the tests demonstrate that sulfide ores as well as concentrates are susceptible to the process of the invention. Unfortunately, the small quantity of ore (C) available did not allow optimization testing on this ore.

Presented in Table 7 are the metallurgical results of Tests 18, 19 and 20 conducted on copper, lead and zinc bearing ore (D). The results show not only that ores are susceptible to the process of the invention but also that zinc may be extracted by the roast-leach process with high percentage extraction. Lead sulfide materials are not susceptible to the extraction process. Although lead sulfate may be produced in the roast, it is not water soluble and therefore is not extracted in the leach process.

TABLE 5

MINERAL SAMPLES AND ADDITIVES PREPARED FOR ROASTING
(All samples roasted at 570° C. for four hours)

| Test | Additive | Percent | |
|---|---|---|---|
| 8 | $Na_2CO_3$ | 10 | Flotation Concentrate of core sample (A) |
| 9 | $Na_2CO_3$ | 20 | Flotation Concentrate of core sample (A) |
| 10 | None | 0 | Flotation Concentrate of core sample (A) |
| 11 | $Na_2CO_3$ | 10 | Flotation Concentrate of core sample (B) |
| 12 | $Na_2CO_3$ | 20 | Flotation Concentrate of core sample (B) |
| 13 | $Na_2SO_4$ | 10 | Flotation Concentrate of core sample (B) |
| 14 | $Na_2SO_4$ | 20 | Flotation Concentrate of core sample (B) |
| 15 | $K_2CO_3$ | 20 | Flotation Concentrate of core sample (B) |
| 16 | $Na_2CO_3$ | 10 | Ore (C) |
| 17 | $Na_2CO_3$ | 20 | Flotation Concentrate of core sample (C) |
| 18 | None | 0 | Ore (D) |
| 19 | $Na_2CO_3$ | 10 | Ore (D) |
| 20 | $Na_2CO_3$ | 20 | Ore (D) |

TABLE 6

METALLURGICAL RESULTS CONDUCTED ON COPPER-NICKEL-COBALT BEARING ORES AND CONCENTRATES

| Test | Product | Weight or Volume | Analysis* | | | | Extraction Percent | | | |
|---|---|---|---|---|---|---|---|---|---|---|
| | | | Cu | Ni | Co | Fe | Cu | Ni | Co | Fe |
| 8 | Residue | 68.1 g | 0.17 | 0.46 | 0.015 | 53.60 | | | | |
| | Filtrate | 725 ml | 3.22 | 1.41 | 0.110 | 1.84 | 95.3 | 76.5 | 88.7 | 3.5 |
| | Calc Head | 100.0 g | 2.45 | 1.34 | 0.090 | 37.80 | | | | |
| 9 | Residue | 59.7 g | 0.07 | 0.34 | 0.013 | 57.00 | | | | |
| | Filtrate | 735 ml | 3.06 | 1.44 | 0.120 | 1.78 | 98.2 | 83.9 | 91.9 | 3.7 |
| | Calc Head | 100.0 g | 2.29 | 1.26 | 0.096 | 35.3 | | | | |
| 10 | Residue | 90.5 g | 1.01 | 1.41 | 0.049 | 55.30 | | | | |
| | Filtrate | 715 ml | 2.75 | 0.39 | 0.080 | 0.15 | 68.3 | 17.9 | 56.3 | 0.2 |
| | Calc Head | 100.0 g | 2.88 | 1.55 | 0.102 | 50.10 | | | | |
| 11 | Residue | 71.7 g | 0.17 | 0.35 | 0.030 | 57.40 | | | | |
| | Filtrate | 670 ml | 4.90 | 1.52 | 0.120 | 1.15 | 96.4 | 80.2 | 78.9 | 1.8 |
| | Calc Head | 100.0 g | 3.40 | 1.27 | 0.102 | 41.90 | | | | |
| 12 | Residue | 63.1 g | 0.076 | 0.22 | 0.026 | 57.10 | | | | |
| | Filtrate | 670 ml | 4.50 | 1.50 | 0.110 | 2.10 | 98.4 | 87.9 | 81.8 | 3.8 |
| | Calc Head | 100.0 g | 3.06 | 1.14 | 0.090 | 37.40 | | | | |
| 13 | Residue | 74.2 g | 0.29 | 0.36 | 0.040 | 54.50 | | | | |
| | Filtrate | 660 ml | 4.73 | 1.26 | 0.150 | 0.53 | 93.6 | 75.7 | 76.9 | 0.9 |
| | Calc Head | 100.0 g | 3.34 | 1.10 | 0.123 | 40.80 | | | | |
| 14 | Residue | 68.0 g | 0.17 | 0.32 | 0.010 | 54.00 | | | | |
| | Filtrate | 640 ml | 4.80 | 1.34 | 0.140 | 1.15 | 96.4 | 79.7 | 93.0 | 2.0 |
| | Calc Head | 100.0 g | 3.19 | 1.07 | 0.096 | 37.50 | | | | |
| 15 | Residue | 66.6 g | 0.51 | 0.47 | 0.030 | 56.40 | | | | |
| | Filtrate | 685 ml | 3.80 | 1.08 | 0.110 | 0.28 | 88.4 | 70.3 | 79.0 | 0.5 |
| | Calc Head | 100.0 g | 2.94 | 1.05 | 0.095 | 37.8 | | | | |
| 16 | Residue | 74.7 g | 0.28 | 1.47 | 0.054 | 31.60 | | | | |
| | Filtrate | 695 ml | 0.81 | 1.21 | 0.070 | 0.34 | 72.9 | 43.3 | 54.7 | 1.0 |
| | Calc Head | 100.0 g | 0.77 | 1.94 | 0.089 | 23.80 | | | | |
| 17 | Residue | 50.6 g | 0.12 | 0.82 | 0.022 | 51.00 | | | | |
| | Filtrate | 710 ml | 2.52 | 3.47 | 0.180 | 5.33 | 96.7 | 85.6 | 92.0 | 12.8 |

TABLE 6-continued
METALLURGICAL RESULTS CONDUCTED ON COPPER-NICKEL-COBALT BEARING ORES AND CONCENTRATES

| Test | Product | Weight or Volume | Analysis* | | | | Extraction Percent | | | |
|---|---|---|---|---|---|---|---|---|---|---|
| | | | Cu | Ni | Co | Fe | Cu | Ni | Co | Fe |
| | Calc Head | 100.0 g | 1.85 | 2.87 | 0.140 | 29.60 | | | | |

*Analysis of Residue and Calculated Head as percent by weight. Analysis of Filtrate given as grams per liter.

TABLE 7
METALLURGICAL RESULTS OF THE TEST CONDUCTED ON A COPPER-LEAD-ZINC BEARING ORE

| Test | Product | Weight or Volume | Analysis* | | | | Extraction Percent | | | |
|---|---|---|---|---|---|---|---|---|---|---|
| | | | Cu | Pb | Zn | Fe | Cu | Pb | Zn | Fe |
| 18 | Residue | 64.5 g | 0.40 | 5.70 | 4.70 | 44.80 | | | | |
| | Filtrate | 535 ml | 0.067 | <0.01 | 7.00 | 0.01 | 12.2 | 0.1 | 55.3 | -0.02 |
| | Calc Head | 80 g | 0.29 | 3.68 | 6.78 | 28.90 | | | | |
| 19 | Residue | 68.8 g | 0.10 | 5.60 | 2.01 | 44.30 | | | | |
| | Filtrate | 640 ml | 0.31 | <0.01 | 8.40 | 0.11 | 74.3 | 0.2 | 79.5 | 0.2 |
| | Calc Head | 100.0 g | 0.27 | 3.86 | 6.76 | 30.50 | | | | |
| 20 | Residue | 52.8 g | 0.02 | 6.70 | 0.23 | 47.20 | | | | |
| | Filtrate | 670 ml | 0.32 | <0.01 | 8.40 | 2.32 | 95.3 | 0.2 | 97.9 | 5.9 |
| | Calc Head | 100.0 g | 0.23 | 3.54 | 5.75 | 26.50 | | | | |

*Analysis of Residue and Calculated Head as percent by weight. Analysis of Filtrate given as grams per liter.

TEST SERIES 4

Laboratory roasting tests were performed on low grade copper-nickel concentrates. The effects on sulfatization of roasting time (one to six hours), roasting temperature (490° C. to 650° C.) and additives ($Na_2SO_4$, $Na_2CO_3$, CaO, $CaCO_3$, $CaSO_4$) were investigated.

A factorial design investigating levels of roasting temperature, roasting time and amount of sodium carbonate added to the roast was conducted. The results demonstrated that within the parameters of the experiment, the amount of sodium carbonate added to the roast was the most significant factor for sulfatization followed by roasting time.

Several bench scale flotation concentrates were composited to provide enough material for several roasting tests. Although flotation composites varied slightly between test series, the difference was not great enough to effect the results. The ore used to prepare the concentrates was from a core sample obtained in the same area as Sample (A) in Test Series 3.

The flotation composite was wet ground to 200 mesh in a laboratory ball mill, dried at 110° C., and split into 150 gram batches for comparison roasting tests.

One 150 gram batch was roasted per test. The specified amount of additive was blended into the sample with a mortar and pestle just prior to roasting. The unvented muffle furnace was preheated to the specified temperature. The concentrate sample was then uniformly spread in a refractory boat and placed in the furnace. The sample was rabbled every 30 minutes for the duration of the roast. The refractory boat was removed immediately upon completion of the roast and allowed to cool. In order to evaluate the degree of sulfatization, a standard leaching procedure was followed. One hundred grams was split from the roasted sample. The sample was placed in a beaker and distilled water was added to produce a 15 percent solids solution. The slurry was agitated for two hours at room temperature and then filtered and washed. A chemical analysis of the residue and filtrate solution was performed to determine recovery of copper, nickel and iron in soluble form.

In a first series of roasting tests, 21–26, an investigation was conducted in order to study the sulfatization effects of various additives: sodium sulfate, calcium sulfate, calcium, oxide, calcium carbonate and sodium carbonate. The flotation composite used in this test series assayed the following percentages; 1.80 Cu, 1.19 Ni, 51.2 Fe, 30.5 S, and 0.11 Co. In each test the specified additive was blended into the sample to equal 10 percent of the total weight. The sample was then roasted at 610° C. for 150 minutes.

Presented in Table 8 are the metallurgical results of these tests. A chemical analysis of the residues and filtrate solutions along with the metal distributions for each leach test is tabulated. The results of the tests indicate that sodium carbonate is the most effective promoter for the sulfatization of the Cu-Ni values.

TABLE 8
METALLURGICAL RESULTS OF ROASTING TESTS INVESTIGATING THE EFFECTS OF VARIOUS ADDITIVES

| Test Number | Additive 10 percent | Leach Additive | Weight grams | Volume ml | (1) Percent or g/l | | | Distribution | | |
|---|---|---|---|---|---|---|---|---|---|---|
| | | | | | Cu | Ni | Fe | Cu | Ni | Fe |
| 21 | None | Residue | 94.8 | | 1.00 | 1.30 | 65.0 | 44.5 | 84.9 | 99.9 |
| | | Filtrate | | 730 | 1.62 | 0.30 | 0.04 | 55.5 | 15.1 | 0.1 |
| 22 | $Na_2SO_4$ | Residue | 78.4 | | 0.14 | 0.49 | 63.4 | 5.6 | 32.1 | 98.9 |
| | | Filtrate | | 745 | 2.40 | 1.09 | 0.73 | 94.4 | 67.9 | 1.1 |
| 23 | $Na_2CO_3$ | Residue | 76.1 | | 0.12 | 0.43 | 61.4 | 4.7 | 29.6 | 99.1 |
| | | Filtrate | | 735 | 2.50 | 1.06 | 0.58 | 95.3 | 70.4 | 0.9 |
| 24* | $CaCO_3$ | Residue | 97.7 | | 1.46 | 1.20 | 56.2 | 75.8 | 90.7 | 99.9 |

TABLE 8-continued

METALLURGICAL RESULTS OF ROASTING TESTS INVESTIGATING
THE EFFECTS OF VARIOUS ADDITIVES

| Test Number | Additive 10 percent | Leach Additive | Weight grams | Volume ml | (1) Percent or g/l | | | Distribution | | |
|---|---|---|---|---|---|---|---|---|---|---|
| | | | | | Cu | Ni | Fe | Cu | Ni | Fe |
| | | Filtrate | | 710 | 0.64 | 0.17 | 0.02 | 24.2 | 9.3 | 0.1 |
| 25 | CaO | Residue | 97.9 | | 1.66 | 1.21 | 48.5 | 96.1 | 94.2 | 99.9 |
| | | Filtrate | | 755 | 0.087 | 0.097 | 0.002 | 3.9 | 5.8 | 0.1 |
| 26 | CaSO₄ | Residue | 91.3 | | 0.77 | 1.29 | 54.3 | 34.4 | 87.7 | 99.6 |
| | | Filtrate | | 720 | 1.86 | 0.23 | 0.26 | 65.6 | 12.3 | 0.4 |

(1) Residue measured in percent
Filtrate measured in g/l

The effect of temperature was investigated in Tests 27–35 when the roasting time was held constant employing a 10 percent by weight sodium carbonate addition. Roasting temperatures between 490° C. and 650° C. were investigated; a roasting time of 240 minutes was used. The flotation concentrates composited for this test work assayed the following percentages: 2.22 Cu, 1.41 Ni, 54.5 Fe, and 29.4 S.

Figure 3:
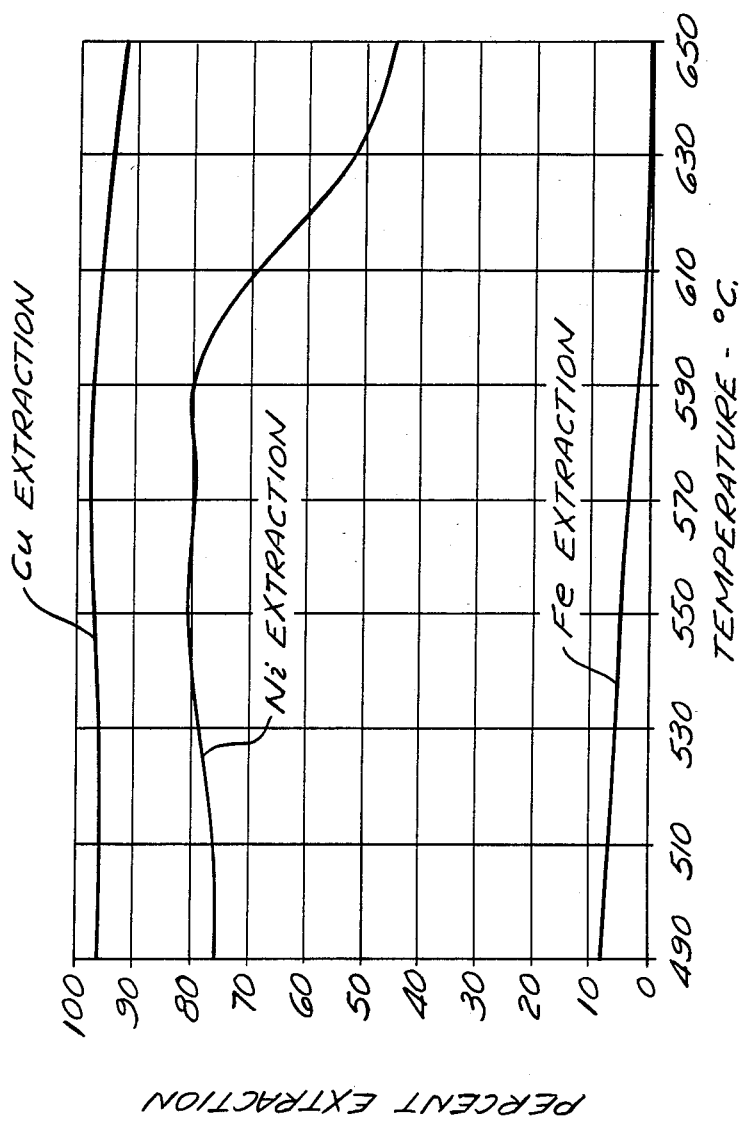
FIG. 3 is a graph showing the effect of roasting temperature on the extraction of copper, iron and nickel in the process of the invention.

Presented in Table 9 are the roasting conditions and the metallurgical results of the temperature dependent roasting tests. A chemical analysis of the residues and filtrate solutions along with the metal distributions for each test is tabulated. Presented in FIG. 3 is a graph illustrating Cu-Ni-Fe recoveries in soluble form as a function of temperature. The results indicate that the copper recoveries span a narrow range throughout the range of temperatures. Nickel recoveries are at a maximum between 550° and 590° C. and sharply decrease with increasing temperatures. Iron recoveries span a narrow range and are inversely proportional to temperature.

were quantified from the results of the previous tests and are listed in Table 10 as Tests 36–52. Three levels each of roasting temperature, roasting time, and percent sodium carbonate addition were incorporated in this experiment. The temperatures selected were 550°, 570° and 590° C., which are above the decomposition temperature of iron (Fe++) sulfate but below the decomposition temperatures of copper (Cu++) sulfate and nickel (Ni++) sulfate. The roasting times selected were 2, 4, and 6 hours. The sodium carbonate addition levels were 0, 10, and 20 percent. With three levels each of roasting temperature, roasting time, and percent sodium carbonate additions, 27 combinations of roasting conditions are possible. The tests employed 0 and 20 percent sodium carbonate additions. The previous test work indicated that the addition of sodium carbonate is necessary to establish nickel sulfatization. However, increasing the sodium carbonate in excess of 10 percent was not determined to be a critical factor in the sulfatization process. The roasting time appeared to be the most significant factor and was therefore emphasized in

TABLE 9

METALLURGICAL RESULTS OF ROASTING TESTS
INVESTIGATING THE EFFECT OF TEMPERATURE

| Test Number | Temp ( ) | Time (min) | Na₂CO₃ (percent) | Product | Weight grams | Volume ml | (1) Percent or g/l | | | Distribution | | |
|---|---|---|---|---|---|---|---|---|---|---|---|---|
| | | | | | | | Cu | Ni | Fe | Cu | Ni | Fe |
| 27 | 490 | 240 | 10 | Residue | 65.5 | | 0.11 | 0.51 | 65.0 | 3.4 | 24.9 | 92.4 |
| | | | | Filtrate | | 730 | 2.80 | 1.38 | 4.78 | 96.6 | 75.1 | 7.6 |
| 28 | 510 | 240 | 10 | Residue | 67.3 | | 0.15 | 0.48 | 64.7 | 4.7 | 24.4 | 93.6 |
| | | | | Filtrate | | 725 | 1.38 | 1.38 | 3.94 | 95.3 | 75.6 | 6.4 |
| 29 | 530 | 240 | 10 | Residue | 69.6 | | 0.12 | 0.45 | 65.0 | 4.2 | 21.5 | 95.2 |
| | | | | Filtrate | | 715 | 2.70 | 1.60 | 3.18 | 95.8 | 78.5 | 4.8 |
| 30 | 550 | 240 | 10 | Residue | 69.6 | | 0.12 | 0.38 | 63.3 | 3.8 | 19.3 | 95.8 |
| | | | | Filtrate | | 745 | 2.80 | 1.48 | 2.56 | 96.2 | 80.7 | 4.2 |
| 31 | 570 | 240 | 10 | Residue | 70.5 | | 0.08 | 0.37 | 64.0 | 2.5 | 19.4 | 98.4 |
| | | | | Filtrate | | 740 | 3.00 | 1.01 | 2.14 | 97.5 | 77.2 | 1.6 |
| 32 | 590 | 240 | 10 | Residue | 72.3 | | 0.077 | 0.35 | 64.0 | 2.9 | 22.8 | 98.2 |
| | | | | Filtrate | | 725 | 2.60 | 1.45 | 1.19 | 97.1 | 80.6 | 1.8 |
| 33 | 610 | 240 | 10 | Residue | 74.7 | | 0.11 | 0.61 | 64.7 | 4.5 | 31.9 | 99.2 |
| | | | | Filtrate | | 720 | 2.41 | 1.35 | 0.51 | 95.5 | 68.1 | 0.8 |
| 34 | 630 | 240 | 10 | Residue | 76.6 | | 0.17 | 0.89 | 64.3 | 5.7 | 48.7 | 99.9 |
| | | | | Filtrate | | 705 | 3.06 | 1.02 | 0.10 | 94.3 | 51.3 | 0.1 |
| 35 | 650 | 240 | 10 | Residue | 77.6 | | 0.24 | 1.09 | 35.3 | 8.1 | 55.1 | 99.9 |
| | | | | Filtrate | | 750 | 2.82 | 0.92 | 0.02 | 91.9 | 44.9 | 0.1 |

(1) Residue measured in percent - Filtrate measured in g/l

Tests were conducted in order to analyze the interactive effects of the roasting variables; time, temperature and amount of additive. Again, several bench scale flotation concentrates were composited to provide enough material for the test series. The composite assayed the following percentages: 2.74 Cu, 1.49 Ni, 47.7 Fe, 27.3 S and 0.10 Co. The variables in this test series this investigation. Roasting times of 2, 4 and 6 hours were used at temperatures of 550°, 570° and 590° C.

The results of these tests indicate that there are interactions between the sodium carbonate addition and the roasting time, and between the roasting temperature and roasting time.

TABLE 10

ROASTING CONDITIONS AND METALLURGICAL RESULTS FOR THE SULFATIZATION OF Cu—Ni FLOTATION CONCENTRATES

| Test Number | Temp | Time | Na₂CO₃ (percent) | Product | Weight grams | Volume ml | (1) Percent or g/l Cu | Ni | Fe | Co | Distribution Cu | Ni | Fe | Co |
|---|---|---|---|---|---|---|---|---|---|---|---|---|---|---|
| | ( ) | (min) | | | | | | | | | | | | |
| 36 | 610 | 150 | 20 | Residue | 61.6 | | 0.12 | 0.52 | 66.3 | | 3.3 | 25.0 | 95.2 | |
| | | | | Filtrate | | 745 | 2.94 | 1.29 | 2.78 | | 96.7 | 75.0 | 4.8 | |
| 37 | 610 | 150 | 10 | Residue | 72.1 | | 0.24 | 0.83 | 62.7 | | 8.2 | 44.1 | 96.9 | |
| | | | | Filtrate | | 745 | 2.60 | 1.02 | 1.96 | | 91.8 | 55.9 | 3.1 | |
| 38 | 610 | 150 | 0 | Residue | 91.8 | | 0.70 | 1.48 | 60.3 | | 24.7 | 84.8 | 99.4 | |
| | | | | Filtrate | | 735 | 2.67 | 0.33 | 0.44 | | 75.3 | 15.2 | 0.6 | |
| 39 | 610 | 60 | 10 | Residue | 71.4 | | 0.85 | 1.52 | 60.3 | | 28.0 | 73.2 | 92.9 | |
| | | | | Filtrate | | 780 | 2.0 | 0.51 | 4.23 | | 72.0 | 26.8 | 7.1 | |
| | (C.) | (hrs) | | | | | | | | | | | | |
| 40 | 590 | 6 | 20 | Residue | 62.5 | | 0.07 | 0.35 | 54.0 | | 1.9 | 19.9 | 95.4 | |
| | | | | Filtrate | | 745 | 2.96 | 1.18 | 2.16 | | 98.1 | 80.1 | 4.6 | |
| 41 | 590 | 4 | 10 | Residue | 69.6 | | 0.18 | 0.64 | 54.3 | 0.02 | 5.2 | 33.9 | 97.9 | 14.8 |
| | | | | Filtrate | | 730 | 3.11 | 1.19 | 1.10 | 0.11 | 94.8 | 66.1 | 2.1 | 85.2 |
| 42 | 590 | 2 | 10 | Residue | 68.6 | | 0.50 | 0.94 | 55.3 | | 13.9 | 57.2 | 93.4 | |
| | | | | Filtrate | | 730 | 2.90 | 0.66 | 3.66 | | 86.1 | 42.8 | 6.6 | |
| 43 | 570 | 6 | 20 | Residue | 60.1 | | 0.05 | 0.23 | 55.7 | | 1.3 | 11.0 | 96.3 | |
| | | | | Filtrate | | 760 | 2.98 | 1.47 | 1.71 | | 98.7 | 89.0 | 3.7 | |
| 44 | 570 | 6 | 10 | Residue | 66.7 | | 0.12 | 0.29 | 57.0 | 0.009 | 3.2 | 14.5 | 96.0 | 6.4 |
| | | | | Filtrate | | 730 | 3.36 | 1.56 | 2.14 | 0.12 | 96.8 | 85.5 | 4.0 | 93.6 |
| 45 | 570 | 4 | 20 | Residue | 59.7 | | 0.07 | 0.34 | 57.0 | | 1.8 | 16.1 | 96.3 | |
| | | | | Filtrate | | 735 | 3.06 | 1.44 | 1.78 | | 98.2 | 83.9 | 3.7 | |
| 46 | 570 | 4 | 10 | Residue | 68.1 | | 0.17 | 0.46 | 53.6 | 0.015 | 4.7 | 27.7 | 96.5 | 11.3 |
| | | | | Filtrate | | 725 | 3.22 | 2.82 | 1.84 | 0.11 | 95.3 | 72.3 | 3.5 | 88.7 |
| 47 | 570 | 4 | 0 | Residue | 90.5 | | 1.01 | 1.41 | 55.3 | 0.049 | 31.7 | 82.1 | 99.8 | 43.7 |
| | | | | Filtrate | | 715 | 2.75 | 0.39 | 0.15 | 0.08 | 68.3 | 17.9 | 0.2 | 56.3 |
| 48 | 570 | 2 | 10 | Residue | 67.4 | | 0.54 | 1.05 | 55.0 | 0.046 | 14.5 | 52.2 | 93.6 | 34.5 |
| | | | | Filtrate | | 735 | 2.91 | 0.88 | 3.43 | 0.08 | 85.5 | 47.8 | 6.4 | 65.5 |
| 49 | 570 | 2 | 10 | Residue | 68.7 | | 0.59 | 1.03 | 55.3 | | 15.8 | 55.7 | 93.7 | |
| | | | | Filtrate | | 750 | 2.88 | 0.75 | 3.42 | | 84.2 | 44.3 | 6.3 | |
| 50 | 550 | 6 | 20 | Residue | 56.9 | | 0.06 | 0.13 | 56.7 | | 1.6 | 6.2 | 93.5 | |
| | | | | Filtrate | | 730 | 2.84 | 1.52 | 3.06 | | 98.4 | 93.8 | 6.5 | |
| 51 | 550 | 4 | 10 | Residue | 67.3 | | 0.18 | 0.43 | 58.0 | 0.02 | 4.8 | 22.4 | 95.8 | 14.6 |
| | | | | Filtrate | | 715 | 3.36 | 1.40 | 2.38 | 0.11 | 95.2 | 77.6 | 4.2 | 85.4 |
| 52 | 550 | 2 | 10 | Residue | 65.9 | | 0.43 | 0.90 | 53.7 | | 91.8 | 46.8 | 92.6 | |
| | | | | Filtrate | | 765 | 2.77 | 0.88 | 3.70 | | 88.2 | 53.2 | 7.4 | |

(1) Residue measured in percent - Filtrate measured in g/l

Analyses were made of sulfide concentrates before and after roasting in the presence of alkali metal carbonate to determine whether sulfate or carbonate products were formed.

Each concentrate was blended with 20% by weight of sodium carbonate and subjected to a four-hour roast at 570° C.

The analyses are presented in Table 11, and it can be seen that, surprisingly, while only a small amount of sulfate ($SO_4$) is present in the concentrate prior to roasting, essentially all the sulfur (S) is present as sulfate ($SO_4$) in the roasted product. The amount of carbon (C) present in the concentrates is reduced to only a trace amount by the roasting process. When roasted concentrate (B) was subjected to water dissolution, copper, nickel, cobalt, and iron extractions were 93.4%, 72.4%, 88.8%, and 3.7%, respectively. When roasted concentrate (C) was subjected to water dissolution, copper, nickel, cobalt, and iron extractions were 96.7%, 85.6%, 92.0%, and 12.8%, respectively.

TABLE 11

ANALYSES OF SULFIDE CONCENTRATES BEFORE AND AFTER ROASTING

| | Percent | | | | | | | |
|---|---|---|---|---|---|---|---|---|
| Product | Cu | Ni | Co | Fe | S | S as SO4 | Na | C |
| Concentrate (B) | 4.3 | 1.23 | 0.10 | 36.7 | 31.0 | 0.5 | 0.23 | 0.11 |
| After Roasting | 3.8 | 1.03 | 0.09 | 31.4 | 10.4 | 10.4 | 7.7 | 0.02 |
| Concentrate | 2.43 | 4.0 | — | 47.9 | 30.9 | 0.12 | 0.09 | 0.34 |

TABLE 11-continued

ANALYSES OF SULFIDE CONCENTRATES BEFORE AND AFTER ROASTING

| | Percent | | | | | | | |
|---|---|---|---|---|---|---|---|---|
| Product | Cu | Ni | Co | Fe | S | S as SO4 | Na | C |
| (C) After Roasting | 1.72 | 2.79 | — | 32.8 | 11.8 | 11.0 | 5.06 | 0.03 |

This invention is applicable to the mining and metal industry. The process of the invention is useful in the extraction of non-ferrous metals from sulfide ores by sulfatization of such metals into water soluble salts which may readily be leached into aqueous solution for recovery of the metals.

What is claimed is:

1. A process for the sulfatization of at least one non-ferrous metal sulfide selected from the group consisting of copper, nickel, cobalt and zinc sulfides which comprises mixing alkali metal carbonate or bicarbonate with sulfide mineral containing said metal sulfide and converting a high percentage of said metal sulfide into water soluble, non-ferrous metal sulfate by roasting the mixture at a temperature greater than the decomposition temperature of iron sulfate but less than the decomposition temperature of the water soluble, non-ferrous metal sulfate.

2. A process for the extraction of at least one non-ferrous metal selected from the group consisting of copper, nickel, cobalt and zinc from sulfide mineral containing at least one sulfide of the non-ferrous metal which comprises:

mixing alkali metal carbonate or bicarbonate with said mineral;

roasting said mixture at a temperature above the decomposition temperature of iron sulfate but below the decomposition temperature of the sulfate of the non-ferrous metal to be extracted;

sulfatizing a high percentage of said metal sulfide to form water soluble non-ferrous metal sulfate in the roasted product;

leaching the roasted product with water to form a solid residue and an aqueous solution containing a high percentage of the non-ferrous metal sulfate;

separating said aqueous solution from the solid residue; and recovering non-ferrous metal from the aqueous solution.

3. A process for the extraction of at least one non-ferrous metal selected from the group consisting of copper, nickel, cobalt, and zinc from sulfide ore containing sulfide mineral comprising at least one sulfide of said non-ferrous metal which comprises:

reducing the particle size of the ore;

concentrating the sulfide mineral by froth flotation to form a sulfide mineral concentrate and solid residue;

separating the concentrate from the residue;

substantially drying the concentrate;

adding alkali metal carbonate or bicarbonate to the concentrate to form a mixture;

roasting the mixture to convert a high percentage of said non-ferrous metal sulfide into water soluble non-ferrous metal sulfate and provide said sulfate in the roasted product;

treating the roasted product with water to dissolve a high percentage of said soluble sulfates from the solids into solution;

separating the sulfate solution from the solids; and recovering non-ferrous metal from the solution.

4. A process as claimed in any of claims 1, 2 or 3 wherein the alkali metal carbonate or bicarbonate comprises sodium carbonate.

5. A process as claimed in claim 1, 2 or 3 wherein the alkali metal carbonate is present in an amount of from 10 to 20% by weight of the mineral roast feed.

6. A process as claimed in claim 1, 2 or 3 wherein the sulfide mineral is roasted at a temperature of from 550° to 650° C.

7. A process as claimed in claim 1, 2 or 3 wherein the sulfide mineral is roasted at a temperature of from 550° to 650° C. for from two to four hours.

* * * * *